May 18, 1948.

W. W. PARTEE ET AL

Re. 23,002

WOOD FINISHING APPARATUS

Original Filed May 6, 1941

Inventors

W. W. Partee
Milton Gray,

By John Boyle Jr.

Attorney

Reissued May 18, 1948

Re. 23,002

UNITED STATES PATENT OFFICE 23,002

WOOD FINISHING APPARATUS

Watkins W. Partee, Memphis, and Milton Gray, deceased, late of Memphis, Tenn., by E. L. Bruce Company, Memphis, Tenn., assignee Original No. 2,288,585, dated June 30, 1942, Serial No. 392,145, May 6, 1941. Application for reissue February 16, 1948, Serial No. 8,644

9 Claims. (Cl. 91—55)

Our invention relates to the manufacture of factory finished wood flooring in the form of strips or blocks. In Patent No. 2,276,253 granted March 10, 1942, there is disclosed a machine and process for producing finished wood flooring that has a finish that deeply penetrates the wood, as differentiated from wood finishes that merely lie on the surface of the wood, and that is tough and elastic, not readily scratched, of good lustre and more durable than prior finishes.

In the above patent, the finishing composition, and stain (when required) and filler were separately applied and in an unheated condition to the cold wood in the order stated, said material being of such character that there was secured a final blending and combination of finish and/or stain, and/or filler in the surface and sub-surface of the wood, all of these materials drying as a unit in the later operations, leading up to and incident to the production of the final finish and polish of the wood. After the finish and filler had been applied and rubbed into the wood, however, it has been necessary heretofore to subject the thus treated wood to curing or air drying for at least 12 hours before applying the wax or other polishing composition. This interim would vary in duration depending upon the humidity and temperature conditions prevailing at the time. This necessitated large storage space for the semi-finished flooring and slowed down the output. In the present invention, the total time expended from the beginning to the end of the operation is about 12 minutes in one integral and continuous operation as compared to as much as three days by the prior process. In addition, the final finish, while of the same general character, is superior.

The operation of the machine and process will be described in connection with the finishing of strip flooring although it is equally applicable to the finishing of block flooring or other wood flooring. Generally speaking, the machine consists of a series of instrumentalities for treating the surface of the wood, which is kiln dried and has a smooth sanded face, the wood being continuously fed past these instrumentalities by a conveyor belt on which the strips of wood are supported. The composition is sprayed on the upper smooth sanded surface of the wood, brushed, heated by passing under a series of infra-red lamps, brushed again and rubbed in, then heated further under a series of infra-red lamps, subjected to further brushing, rubbing in, and buffing, then a coating of paste wax is applied and polished until dry and hard.

Referring to the drawing for a more complete disclosure of the invention:

Figs. 1*a* and 1*b* represent a plan view of the machine, 1*b* being a continuation in the same straight line as 1*a*, the entire machine being about 200 feet long;

Figures 1A, 1B, 2, 3:
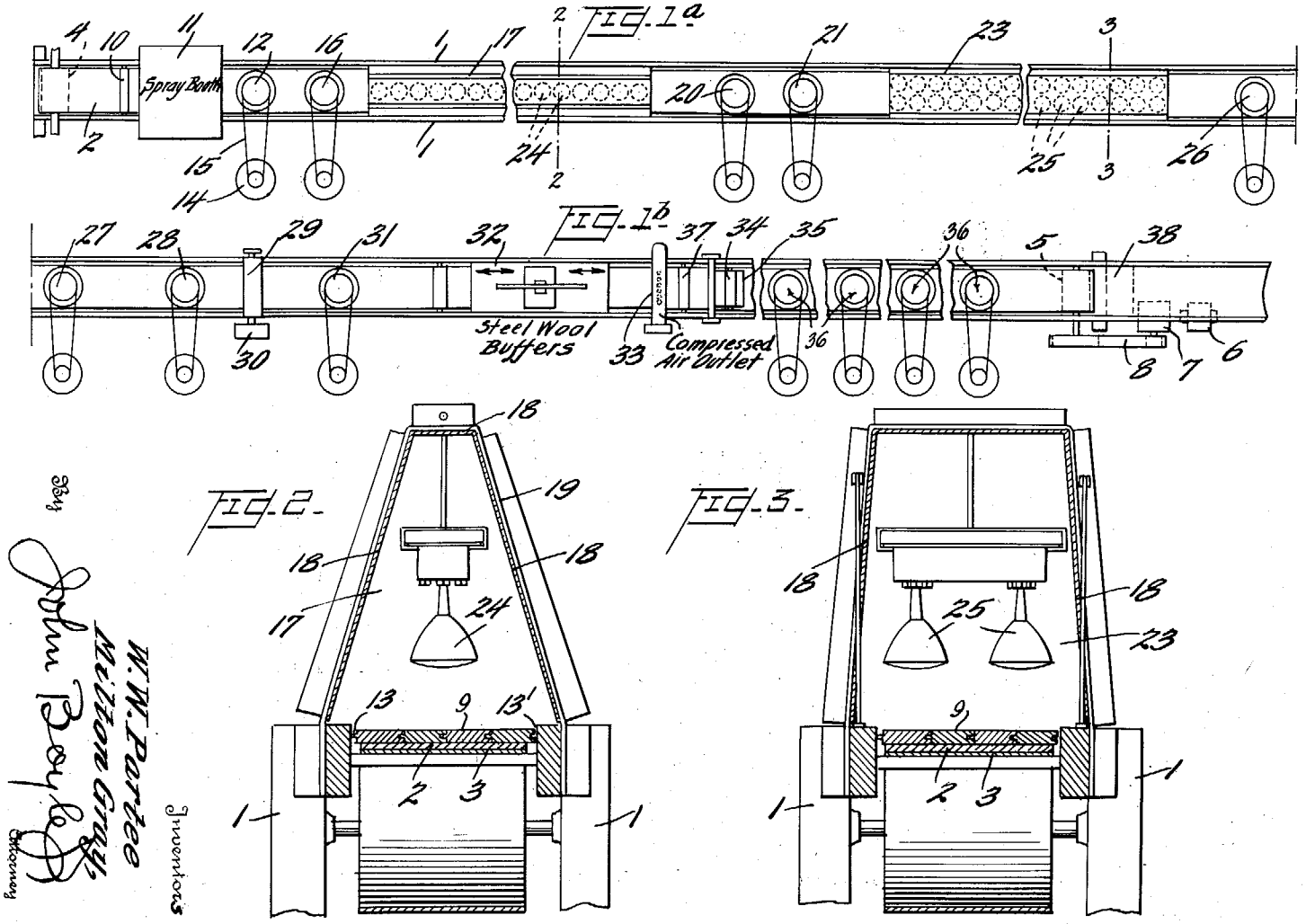
Fig. 2 is an enlarged transverse section on the line 2—2 of Fig. 1*a*.
Fig. 3 is a similar view on the line 3—3 of Fig. 1*a*.

The machine consists of side frames 1 and between these traverses the endless rubber belt 2, which overlies a sheet metal plate 3. The belt at each end is supported by pulleys 4 and 5 and is driven by the motor 6 through the speed reducer 7, belt connection 8 and pulley 5. The flooring strips 9 are placed on the belt conveyor 2 by an operator and pass under a steel pressure roller 10 to insure a flat horizontal surface of flooring, as they pass under the spray booth 11, where the finishing composition and filler and color is applied. The strips are in tongue and groove engagement as seen in Figs. 2 and 3 and the longitudinal tongue side 13 may engage a corresponding groove along the side of the machine, spring steel flat springs 13′ on one side of the line, spaced about every 6 feet, keeping the strips of flooring together by forcing it to one side.

The particular type of composition that we apply to the surface of the floor is what is known as a penetrating seal finish, an example of such being disclosed in the patent to F. H. Lyons 2,066,-296 granted Dec. 29, 1936, except for the paraffin wax which should be practically eliminated. Compositions of this character contain such skin forming drying oils as linseed oil and China wood oil and a resin, all in a volatile solvent such as naphtha. Such compositions have the property of rapidly penetrating the wood when applied. These compositions, after evaporation of the volatile solvent or vehicle, dry and harden, either by oxidation or polymerization. The usual silex filler and a dye or stain can be thoroughly mixed with the finishing composition, the different ingredients being miscible with each other and applied by a mechanically operated spray in a predetermined quantity per unit of area to secure an even and uniform distribution over the surface of the wood. When applied to maple flooring, a dense and closed pore wood, rather than red oak flooring, a less dense and open pored wood, the filler may be dispensed with. The coating composition may consist of a finish and stain, a finish and filler, or finish, stain and filler. Some woods do not require a filler and when any wood is finished "natural" no stain is used.

Immediately following, the spraying of the coating composition on the wood, the flooring which is moving on the belt conveyor at the rate of 17 feet per minute, is brushed by the revolving bristle brush 12, driven by the motor 14 through the belt 15. This brush spreads the composition uniformly over the surface of the wood. The flooring next meets the revolving burlap pad buffer 16 which further uniformly spreads and removes any surplus composition. All the successive brushes or pads, rotating on a vertical axis are driven through an independent motor and belt arrangement of the same kind as drives the brush 12, and they can be swung up vertically on a horizontal pivot, off of the surface of the wood, for changing and cleaning brushes and pads.

Following the operations just described, the flooring enters the first infra-red light line 17, this particular line being about 30 feet long and containing a single row of 250 watt infra-red lamps 24. These lamps 24 are spaced about 5½ inches on centers, 4–5 inches above the surface of the floor and maintain an oven heat of about 165 degrees F. The lamps are enclosed in a tunnel formed on the bottom by the belt or flooring and on the sides and top by sheet metal plates 18 supported on angle iron framing 19, the purpose of the tunnel being merely to conserve heat and avoid cross currents of air.

The flooring, after it leaves the tunnel at a temperature of about 130–135 degrees F., passes under a revolving bristle brush 20, then passes under another revolving bristle brush 21. These two operations serve to rub the materials in and fill up the minute depressions, and also to distribute them in a more uniform way, on the surface of the flooring, and to some extent remove the marks left by the previous distributing brushes which have operated on the surface of the flooring before it entered the first light line 17.

The flooring now enters a second line 23 of infra-red lamps 25 which is spaced about 5 feet from the first line, the tunnel being formed of plates 18, in substantially the same way as the tunnel in the line 17. The tunnel is of the same length as the first tunnel and the lamp arrangement is otherwise the same as in the first tunnel except that there are twice as many lamps in the two rows, as in the line 17. The oven temperature in the line 23 is about 210 degrees F. and the wood as it leaves the oven is about 172 degrees F.

Due to the different temperature conditions and the different progressive conditions of the impregnating compositions in the two sections, the changes that take place may be explained in part as follows:

In the first tunnel, the radiant heat drives out some of the moisture in the wood and which may inhibit proper penetration of the coating composition or adversely affect the final finish. The kiln dried wood normally contains about 8% moisture. The moisture which evaporated in part as indicated, will be replaced by the finishing composition. The heat also makes the finishing composition more fluid, reducing its viscosity so that it has increased penetrating properties. The solvent vehicle and carriers in the finish also start volatilizing, which causes drying of the composition and the forming of a firmer final bond in the wood. Chemical changes in the composition are also started in the first section, the finish setting up and holding the filler.

In the second heat section, substantially all of the solvents in the composition are removed by evaporation and the final set of the finish and filler is completed. In this heat section oxidation or polymerization of certain ingredients go to completion and this action is complete not only for the surface portion but for that portion of the composition that has penetrated deeply into the pores of the wood.

If the temperature in the first section were high, the composition would set up too fast and, the composition could not be properly rubbed in. Also a high temperature might prevent satisfactory elimination of surplus filler.

The desirable results that are attained by the use of infra-red rays are due to the fact that heat is produced within and throughout the entire thickness of finishing composition and the wood. The effect seems to be that the wood is heated from the inside out, as differentiated from mere surface heating of the wood by conduction from the outside in.

Since the composition used is of a character that penetrates the wood, the whole mass of composition is affected and not merely case hardened on the surface which condition would seal in the wood, the excess moisture in the wood, and the volatile components of the composition. There is also a more uniform distribution of the coating composition, when it is "worked" and rubbed in while in a heated condition.

After leaving the light section 23, the flooring meets the revolving bristle brushes 26, 27 and 28 which further "work" and rub in the composition. They also serve to lay the foundation for the final gloss and sheen by starting to polish and buff the surface of the wood while it is still warm.

Following these three brushes, is a high speed cylindrical bristle brush 29 driven by the motor 30, which removes any circular streaks from the prior brushes. Following this is another revolving bristle brush 31 that removes any foreign surplus material.

The next operation consists of a steel wool buffer 32 that reciprocates back and forth with the travel of the flooring along the line. This removes surplus filler, raised grain and extended particles of wood fibre that may be on the surface of the flooring.

Following the steel wool buffer, there is a regulated compressed air blower 33, directing a current of air on the surface of the flooring that removes all particles of steel wool and other loose material and also serves to cool to a certain degree, the surface of the flooring, in preparation for its reception of the waxing that is to follow.

The next operation on the flooring is to apply to the upper surface a coating of wax. This is done by means of a revolving roller 34 that has a felt pad applied over it and is warmed by contact with the heated flooring and so set that the movement of the flooring below the roller, revolves the roller which rotates through a quantity of paste wax in a pan or hopper 35. As the flooring is fairly warm at this point the roller pad is kept constantly warm and thereby moist with melted wax. The temperature of the roller being slightly above the melting point of the wax enables a much more even distribution of wax over the face of the flooring than would be otherwise obtained. Heating of the wax may be augmented by a light focused directly on the wax, in the case of higher melting waxes.

The flooring then proceeds to four revolving bristle brushes 36, the purpose of these brushes being to thoroughly polish the surface of the flooring. These brushes are placed at predetermined distances so as to give sufficient time for the cooling of the flooring and so that the wax polishing operation may be completed before the flooring reaches the final bundling section table.

At several points of the finishing line, steel rollers 37 which are idle, are placed on top of the flooring to prevent any pieces from getting out of line and disrupting the continuous operation.

If desired, the bottom of the flooring can have applied to it a coating of paraffin wax as it passes over the receptacle 38 carrying the liquid paraffin.

One of the advantages of our machine arises out of the fact that the finishing composition and the wood are mechanically worked on while in a warmed or heated condition. This is particularly advantageous in connection with the penetrating seal type of finish as described herein. For example, the wood filler in normal use is applied cold and is rubbed into the cold surface of the wood. With the wood surface in a heated condition, the pores are more open than when the wood is cold and the warmed or heated filler more readily enters and fills the pores and small openings in the wood, resulting in a better filled product. Excess moisture that is released from the wood by heating naturally seeks egress through the surface and aids in opening up the pores. Heating acts both on the finish and the stain in much the same manner, causing them to become thinner and to penetrate the wood more readily. The amount of effort required in rubbing in the ingredients of the finishing composition is greatly reduced when the wood is worked on while in a heated condition and a more even and uniform distribution of them is obtained, such evenness and uniformity of distribution being important for a good finish job.

Other means for heating the flooring than by infra-red lamps could be used but the infra-red lamps have been found satisfactory in use.

We claim:

1. In apparatus for finishing wood flooring; means for applying a composition to the surface of the wood comprising, an applicator for applying a penetrating finish, and brushing means for removing surplus finish and for uniformly spreading the finish over the wood; means for heating and setting the coated surface of the wood comprising an elongated radiant heater for radiating energy into the wood generating heat in the pores of the wood that have been penetrated by the finish; means for polishing the heated surface of the wood comprising a polishing brush, a waxer, and a series of spaced polishing brushes; the applicator and the waxer constituting the only devices associated with the apparatus for applying a composition to the surface of the wood; and a conveyor for conveying the flooring past the aforesaid instrumentalities in the order stated, said conveyor carrying the flooring that is between said spaced polishing brushes through a medium cooler than the flooring whereby the wax passes through successive cooling stages between the brushes of the series.

2. An apparatus for finishing wood flooring comprising means for applying a finish composition to the surface of the wood, an extended series of infra-red lamps nearby said means for heating the coated surface of the wood to accelerate the setting of the finish composition and to effect only a partial set of such composition; brush means adjacent the last lamp of said series for brushing the flooring while hot, to rub the composition in the flooring and to fill up the minute depressions; a second extended series of infra-red lamps the first lamp of which is ajacent said brush means and which series effects a substantially complete set of the finish composition; and a conveyor for conveying the flooring past the aforesaid instrumentalities in the order named and at such speed that the flooring reaches the second series of lamps while only partially set.

3. An apparatus for finishing wood flooring comprising means for applying a penetrating seal type of finish to the surface of the wood; brushing means for uniformly spreading the composition and removing surplus composition that has not penetrated the surface pores of the wood; an extended series of infra-red lamps nearby said brushing means for heating the coated surface of the wood to accelerate the setting of the finish composition and to effect only a partial set of such composition; brush means adjacent the last lamp of said series for brushing the flooring while hot to rub the composition into the flooring and to fill up the minute depressions; a second extended series of infra-red lamps the first lamp of which is adjacent said brush means and which series effects a more complete set of the finish composition; brush means near the last lamp of the second series for brushing and rubbing the finish while hot; a waxer for applying wax to the surface of the heated flooring; a series of spaced polishing brushes for polishing the waxed surface during different stages of the cooling thereof; and a conveyor for conveying the flooring past the aforesaid instrumentalities in the order named in a time period not exceeding the order of twelve minutes.

4. An apparatus for finishing wood flooring comprising means for applying a penetrating seal type of finish composition to the surface of the wood, means to rub off the surplus composition from the surface of the wood, an elongated radiator for radiating energy into the sub-surface of the wood to heat the wood and to set the finish therein, means for polishing the heated surface of the wood while hot comprising a series of spaced brushes which work and rub the composition in the wood during successive stages of the cooling of the flooring, a waxer for applying a wax to the surface of the flooring, a series of spaced polishing brushes for polishing the waxed surface during successive stages of the cooling thereof, and a conveyor for conveying the flooring past the aforesaid instrumentalties in the order named and for delivering the flooring to the waxer while the flooring is heated.

5. In apparatus for finishing wood flooring, an applicator for applying a finish composition to the surface of the wood, means for uniformly spreading the finish over and removing surplus finish from the surface of the wood, an elongated infra-red radiator for radiating energy through the surface of the wood and into the surface pores thereof thereby heating the coated surface of the wood, means for polishing the heated surface of the wood comprising a brush adjacent the radiator for brushing and rubbing the heated surface of the wood, and a conveyor for conveying the flooring past the aforesaid instrumentalities in the order stated.

6. In apparatus for finishing wood flooring; means for applying a composition to one surface of the wood comprising, an applicator for depositing a penetrating finish on said surface, and brushing means for rubbing the coated surface to uniformly spread the finish and remove surplus finish from said surface; means for heating the coated surface of the wood to condition it for polishing comprising an elongated infra-red radiator for radiating sufficient energy into the surface pores of the wood to set the composition in the wood; brushing means adjacent the radiator for rubbing the heated surface of the wood to rub in the composition; a waxer for applying wax to said surface of the wood; a moving polishing element for polishing the waxed surface; and means for conveying the flooring past the aforesaid instrumentalities in the order stated.

7. An apparatus for finishing wood flooring comprising means for applying a composition to the surface of the wood, means for heating the coated surface of the wood to condition it for polishing, the last-named means including an elongated radiator of infra-red radiations for radiating energy into the surface pores of the wood generating enough heat therein to set the composition, a waxer for applying a polishing wax composition to the surface of the wood, a movable polishing brush for polishing the waxed surface, and means for conveying the flooring past the aforesaid instrumentalities in the order stated.

8. In apparatus for finishing wood flooring; means for applying a finish composition to the surface of the wood; heating means for heating the coated surface of the wood to condition it for polishing; means for applying a polishing composition to the surface of the wood comprising a waxer for waxing the hot wood surface; means for polishing the waxed surface comprising a plurality of polishing brushes the first of which brushes spreads the wax while the wood is still hot, said polishing brushes being spaced longitudinally of the path of travel of the flooring so as to polish the waxed surface during different stages of the cooling thereof; and means for conveying the flooring past the aforesaid instrumentalities in the order stated.

9. A machine for completely finishing and waxing one surface of oak flooring in a form ready for use comprising a conveyor adapted to receive a continuous series of strips of flooring and to carry them in one continuous motion past the hereinafter named instrumentalities in the order named and in a time period not greater than the order of twelve minutes, applicator means for uniformly applying and spreading on said surface of the flooring a composition composed of a penetrating seal type of finish mixed with a filler, means for heating the coated surface of the wood including an elongated tunnel through which the conveyor carries the wood, said tunnel having an elongated radiator of infra-red energy therein for radiating energy into pores of the wood near the aforesaid surface, whereby to set the finish composition that has been applied to the wood, and to condition the wood for polishing, a brush adjacent the exit end of the tunnel for brushing the aforesaid surface of the flooring to rub in the composition, a waxer for waxing said surface while the latter is in heated condition, and a polisher for spreading the wax and for polishing the waxed surface while said surface is above ambient temperature; said applicator and said waxer constituting the only instrumentalities associated with the machine for applying compositions to said surface.

WATKINS W. PARTEE.
E. L. BRUCE COMPANY,
*Assignee of Milton Gray, Deceased,*
By E. L. BRUCE, Jr.,
*President.*

REFERENCES CITED

The following references are of record in the file of this patent:

UNITED STATES PATENTS

| Number | Name | Date |
|---|---|---|
| 1,316,674 | Blackketter | Sept. 23, 1919 |
| 1,510,465 | Dittmar | Oct. 7, 1924 |
| 1,510,466 | Dittmar | Oct. 7, 1924 |
| 1,510,467 | Dittmar | Oct. 7, 1924 |
| 1,860,664 | Edgecumbe et al. | May 31, 1932 |
| 1,998,615 | Groven | Apr. 23, 1935 |
| 2,066,296 | Lyons | Dec. 29, 1936 |
| 2,276,253 | Partee | Mar. 10, 1942 |
| 2,321,937 | Quinn | June 15, 1943 |